(12) United States Patent
Tillotson et al.

(10) Patent No.: US 11,027,303 B2
(45) Date of Patent: Jun. 8, 2021

(54) SYSTEM AND METHOD FOR DISPENSING FLUID IN RESPONSE TO A SENSED PROPERTY

(71) Applicant: SENSORY DESIGN & TECHNOLOGY LTD., Cambridge (GB)

(72) Inventors: Jenny Tillotson, London (GB); Gareth Jenkins, Dortmund (DE)

(73) Assignee: SENSORY DESIGN & TECHNOLOGY LTD., Cambridge (GB)

(*) Notice: Subject to any disclaimer, the term of this patent is extended or adjusted under 35 U.S.C. 154(b) by 0 days.

(21) Appl. No.: 15/620,220

(22) Filed: Jun. 12, 2017

(65) Prior Publication Data
US 2018/0093288 A1    Apr. 5, 2018

Related U.S. Application Data

(63) Continuation of application No. 11/720,635, filed as application No. PCT/GB2005/004237 on Nov. 1, 2005, now Pat. No. 9,675,987.

(30) Foreign Application Priority Data

Dec. 1, 2004  (GB) .................................. 0426382.8

(51) Int. Cl.
*B05B 12/12*     (2006.01)
*A01M 1/20*     (2006.01)
(Continued)

(52) U.S. Cl.
CPC ........... *B05B 12/122* (2013.01); *A01M 1/026* (2013.01); *A01M 1/2038* (2013.01); *B05B 17/0607* (2013.01)

(58) Field of Classification Search
CPC . A01M 1/026; A01M 1/2038; B05B 17/0607; B05B 12/122
See application file for complete search history.

(56) References Cited

U.S. PATENT DOCUMENTS 3,913,840 A    10/1975  Kato
4,052,979 A    10/1977  Scherr et al.
(Continued)

FOREIGN PATENT DOCUMENTS

GB    2375389 A    11/2002
JP    S60210931    12/1986
(Continued)

OTHER PUBLICATIONS

USC Institute for Creative Technologies, "Scent Your Senses: The SEE Project's Scent Collar a big hit at SIGGRAPH!", Aug. 2004.
(Continued)

*Primary Examiner* — Christine H Matthews
*Assistant Examiner* — Joshua Daryl D Lannu
(74) *Attorney, Agent, or Firm* — Renner, Otto, Boisselle & Sklar, LLP (57) ABSTRACT

A system for dispensing fluid in response to a sensed property such as an ambient sound comprises a sensor for detecting one or more properties, a processing stage for determining if the one or more sensed properties is/are within a predetermined range and/or above and/or below a predetermined level and dispenser for dispensing a fluid into an area surrounding the system if the one or more sensed properties is/are determined by the processing stage to be within a predetermined range and/or above and/or below a predetermined level and/or value.

16 Claims, 10 Drawing Sheets

(51) Int. Cl.
*A01M 1/02* (2006.01)
*B05B 17/06* (2006.01)

(56) References Cited

U.S. PATENT DOCUMENTS

| | | | |
|---|---|---|---|
| 4,627,385 A | 12/1986 | Vinci | |
| 4,702,418 A | 10/1987 | Carter et al. | |
| 4,758,708 A | 7/1988 | Manchester | |
| 5,241,778 A | 9/1993 | Price | |
| 5,243,992 A | 9/1993 | Eckerle et al. | |
| 6,213,955 B1* | 4/2001 | Karakasoglu | A61B 5/087 |
| | | | 128/204.23 |
| 6,267,297 B1 | 7/2001 | Contadini et al. | |
| 6,319,724 B1 | 11/2001 | Lewis et al. | |
| 6,554,203 B2 | 4/2003 | Hess et al. | |
| 6,712,287 B1* | 3/2004 | Le Pesant | A61L 9/125 |
| | | | 239/346 |
| 6,722,529 B2 | 4/2004 | Ceppaluni et al. | |
| 7,073,731 B2 | 7/2006 | Hess et al. | |
| 7,387,265 B2 | 6/2008 | Hess et al. | |
| 2002/0173745 A1 | 11/2002 | Santini et al. | |
| 2003/0152603 A1 | 8/2003 | Johnson | |
| 2003/0192922 A1 | 10/2003 | Ceppaluni et al. | |
| 2004/0093190 A1* | 5/2004 | Beroza | A01M 1/026 |
| | | | 702/189 |
| 2005/0185398 A1* | 8/2005 | Scannell, Jr. | A01G 9/02 |
| | | | 362/227 |
| 2007/0138326 A1 | 6/2007 | Hu | |

FOREIGN PATENT DOCUMENTS

| | | |
|---|---|---|
| JP | 0193674 A2 | 12/2001 |
| JP | 2003534817 | 12/2001 |
| JP | 2003339292 A | 12/2003 |
| WO | 2004010762 | 2/2004 |
| WO | 2005023679 | 3/2005 |
| WO | 2005099663 A2 | 10/2005 |

OTHER PUBLICATIONS

Washburn et al.; "Could Olfactory Displays Improve Data Visualization?", Visualization Corner, Computing in Science and Engineering, Nov. 2004, pp. 80-83.

* cited by examiner

SYSTEM AND METHOD FOR DISPENSING FLUID IN RESPONSE TO A SENSED PROPERTY

This application is a continuation of U.S. patent application Ser. No. 11/720,635 filed on Feb. 8, 2010, which is a U.S. National Phase of PCT/GB2005/004237 filed Nov. 1, 2005, which claims priority to United Kingdom Patent Application No. 0426382.8 filed Dec. 1, 2004, which are all hereby incorporated herein by reference in their entirety.

FIELD OF THE INVENTION

The present invention relates to a system and method for dispensing fluid in response to a sensed property, such as a biometric property, of an individual or various sounds.

BACKGROUND OF THE INVENTION

Many insects, including mosquitoes, present not only a nuisance to people from their bites but also pose a threat of infectious diseases being passed to individuals in certain regions of the world. Various methods exist to combat this threat of disease transmitted by insects and these methods include large scale population control, such as spraying wide areas with pesticides using aircraft, and the use of topical repellents applied to the skin of individuals. However, in the case of individual protection against insect bites, to be effective for reasonably long periods of time, large amounts of repellents generally need to be applied directly to the skin of an individual. This may pose problems both from unpleasant odours and possible allergic skin reactions which, in turn, limits the range of possible chemicals which may be used and hence the effectiveness of the repellent.

Certain scents, such as citronella are known to act as insect repellants for insects such as mosquitoes and various devices such as citronella candles are commonly used in outdoor environments in an attempt to repel insects. However, it is common to use scents in the form, for example, of aromatherapy oils or candles for other purposes as well as insect repellents, for example to reduce stress levels in some individuals and typical scents include St John's Wort Rescue Remedy®, or aromatherapeutic scents such as lavender, chamomile, or sage.

Stress may be caused by any number of factors including high decibel-level sound which has been identified as a stress-inducing factor, as well as a health and safety risk, if an individual remains exposed to constant noise above 80 decibels. Whilst health and safety regulations encourage workers exposed to such risk to wear protective apparatus, little has been done to address the problem of noise causing stress to passers-by and in such circumstances, the passers-by would not generally have instant access or be able to use known stress-reducing devices such as aromatherapy oils or candles.

Thus, in view of the foregoing problems with conventional processes and devices, a need exists for a method and apparatus which may be used arranged to assess a user's needs and respond appropriately with the dispensing of a fluid or scent appropriate to those needs, in various situations, for example to act as insect repellent, or to reduce stress levels in individuals, or to address particular health factors in a user and which, in a preferred embodiment is portable.

SUMMARY OF THE INVENTION

In general terms, the present invention proposes in a first aspect a system for dispensing fluid in response to a sensed property comprising:

a sensor for detecting one or more properties;

a processing stage for determining if the one or more sensed properties is/are within a predetermined range and/or above and/or below a predetermined level; and a dispenser for dispensing a fluid into an area surrounding the system if the one or more sensed properties is/are determined by the processing stage to be within a predetermined range and/or above and/or below a predetermined level and/or value.

According to a second aspect there is provided a system for dispensing fluid in response to a sensed ambient sound comprising:

a sensor for sensing one or more ambient sounds;

a processing stage for determining if the one or more sensed ambient sounds is/are within a predetermined range and/or above and/or below a predetermined level; and a dispenser for dispensing a fluid if the one or more sensed ambient sounds is/are determined by the processing stage to be within a predetermined range and/or above and/or below a predetermined level and/or frequency.

Thus, in a preferred embodiment, the sensor is arranged to detect one or more ambient sounds.

Preferably, the sensor comprises a microphone.

In a preferred embodiment, the processing stage is arranged to determine the frequency or frequencies of one or more determined sounds and/or the amplitude (decibel) level(s) of said one or more sounds.

Preferably, the processing stage is arranged to determine the source of one or more of the sounds.

Preferably, the source of one or more of the sounds is an insect such as a mosquito.

Preferably, the sensor is arranged to detect one or more biometric properties of a user.

In a preferred embodiment, one or more of the biometric properties comprise any one or more of heart rate, blood pressure, respiratory rhythms, and circulation.

Preferably, the processing stage comprises one or more filters. In a preferred embodiment, the one or more filters comprise one or more band-pass filters.

Preferably, the processing stage further comprises an amplifier connectable between the sensor and the one or more filters.

Preferably, the processing stage further comprises a microprocessor.

Preferably, the processing stage comprises one or more digital signal processing components.

Preferably, the system further comprises a fluid reservoir connectable to the dispenser for supplying fluid to be dispensed to the dispenser.

In a preferred embodiment, the sensor has an output, the processing stage further comprising an amplifier having an output, the amplifier being connectable to the output of the sensor, and an analogue-to-digital converter connectable to the output of the amplifier.

Preferably, the system further comprises a dispenser control stage for controlling operation of the dispenser.

Preferably, the analogue-to-digital converter has an output signal, wherein the output signal being applicable to the processor using a wireless link, the processor having an output signal, and wherein the output signal from the processor drives the dispenser control stage, the output signal from the processor being applicable to the dispenser control stage using a wireless link.

Preferably, the processor includes audio analysis software for determining if the one or more sensed properties is/are within a predetermined range and/or above and/or below a predetermined level.

Preferably, the processing stage further comprises a differential amplifier having an output, a Schmitt trigger having an input and an output, and an AND gate having an input, the output of the differential amplifier being applied to the input of the Schmitt trigger, the output of the Schmitt trigger being applied to the input of the AND gate to determine if the one or more sensed properties is/are within a predetermined range and/or above and/or below a predetermined level.

Preferably, the processing stage is mountable in a separate unit from the dispenser.

Preferably, one or more of the sensor, the processing stage and the dispenser are mountable in/on jewellery for wear by a user.

Preferably, one or more of the sensor, the processing stage and the dispenser are attachable to an accessory for wear by a user.

Preferably, one or more of the sensor, the processing stage and the dispenser are arranged to be embodied in a fabric.

Preferably, the fluid to be dispensed comprises an insect repellent.

Preferably, the fluid to be dispensed comprises a scent.

Preferably, the fluid to be dispensed comprises a scent having stress-reducing properties.

Preferably, the dispenser comprises a piezo-electric device.

Preferably, the dispenser comprises a thermally actuated device.

Preferably, the thermally actuated device comprises a wire locatable within a capillary tube connected between a fluid reservoir and a dispensing nozzle, wherein the fine wire is arranged to receive one or more pulses of current to vaporize fluid in the capillary tube surrounding the wire causing one or more droplets of fluid to form and be ejected from said dispensing nozzle.

According to a third aspect of the present invention there is provided a method for dispensing fluid in response to a sensed property comprising:

detecting using a sensor one or more properties;

determining in a processing stage if the one or more detected properties is/are within a predetermined range and/or above and/or below a predetermined level; and     dispensing using a dispenser a fluid into an area surrounding the system if the one or more detected properties is/are determined by the processing stage to be within a predetermined range and/or above and/or below a predetermined level and/or value.

One or more of preferred embodiments of the present invention are particularly advantageous as they may be incorporated into a personal wearable device, such as integrated into pieces of jewellery, or into the fabric of clothing. The wearer's stress levels may be reduced via the diffusion of a chosen scent.

One or more of preferred embodiments of the present invention may also be used in a sensory, pleasure-inducing capability and in other realms of audio-sensory experience.

Furthermore, one or more of preferred embodiments of the present invention may enable efficient protection from mosquitoes or other insects with the use of one or several devices which can be worn by an individual, either integrated into pieces of jewellery or into the fabric of clothing for dispensing insect repellent. The devices may be positioned at locations about a person's body which are vulnerable to mosquitoes. Such locations include the neck area, wrists and ankles where the skin is exposed and entry points exist for mosquitoes to enter a persons clothing.

Preferably, in the case of use of the systems embodying the invention as an insect repellent dispenser, the release of chemical agents may be arranged only to occur when a mosquito is in range and directed towards the mosquito thus minimizing exposure to the skin of the user.

BRIEF DESCRIPTION OF THE DRAWINGS

Preferred features of the invention will now be described, for the sake of illustration only, with reference to the following Figures in which.

DETAILED DESCRIPTION OF PREFERRED EMBODIMENTS

Figure 1:
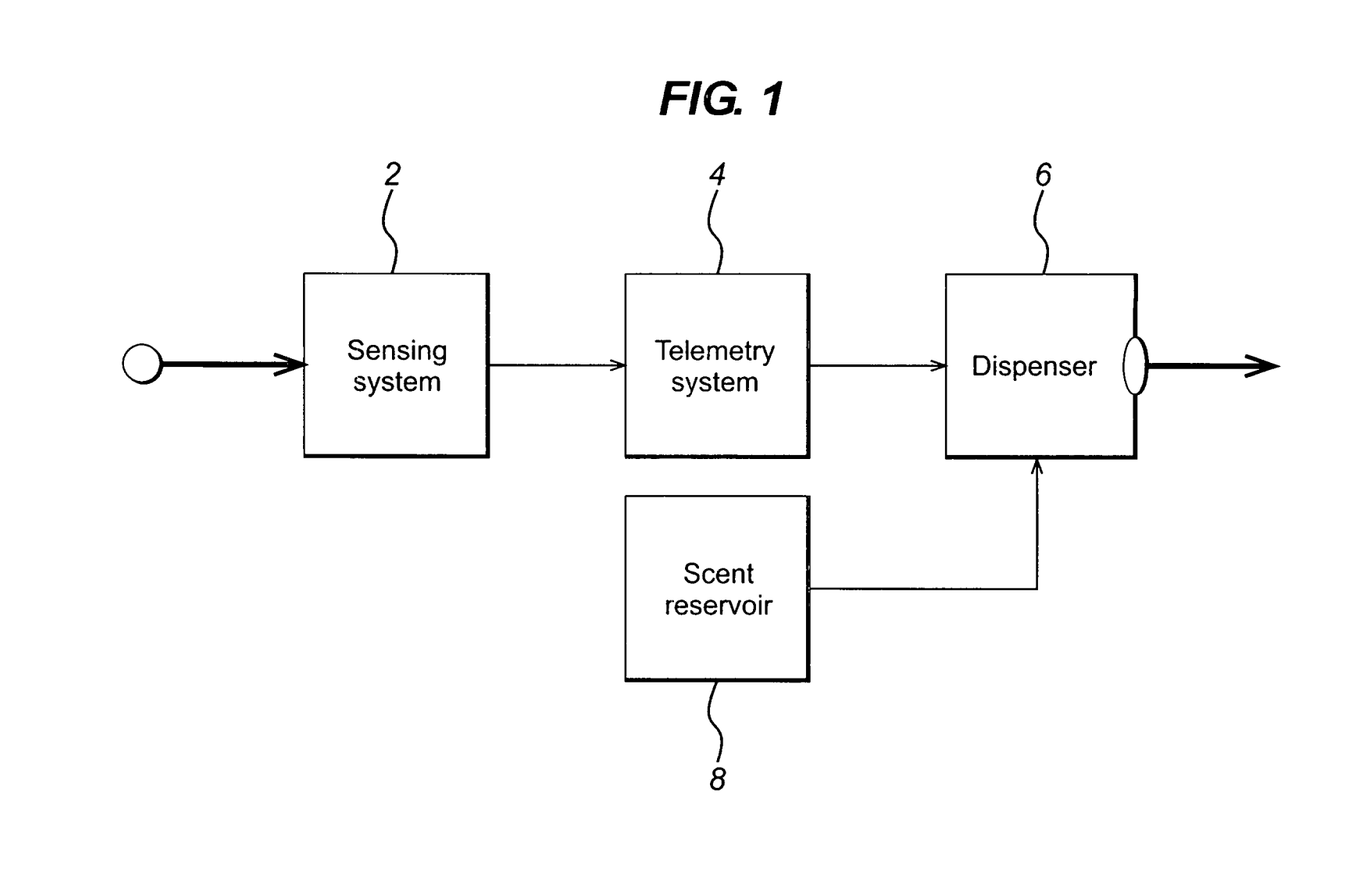
FIG. 1 is a schematic block diagram of a system according to a preferred embodiment of the invention.

FIG. 1 is a schematic block diagram of a general system according to a preferred embodiment of the invention. The system comprises a sensing system 2 coupled to a telemetry system 4 which drives a dispenser system 6. The dispenser system 6 preferably dispenses fluid such as a scent, preferably in the form of a spray, from a reservoir 8 which may be incorporated within the housing of the dispenser system 6. In operation, the sensor system 2 detects properties such as sounds (in which case detection will be on the basis of frequency and/or decibel level) and, if the detected property is within predetermined limits, and/or above and/or below a predetermined level, as desired, activates the telemetry system 4 to control the dispensation of scent from the dispenser system 6. The telemetry system 4 is optional and, if omitted, the dispenser system 6 may be driven directly by the sensing system 2.

Figure 2:
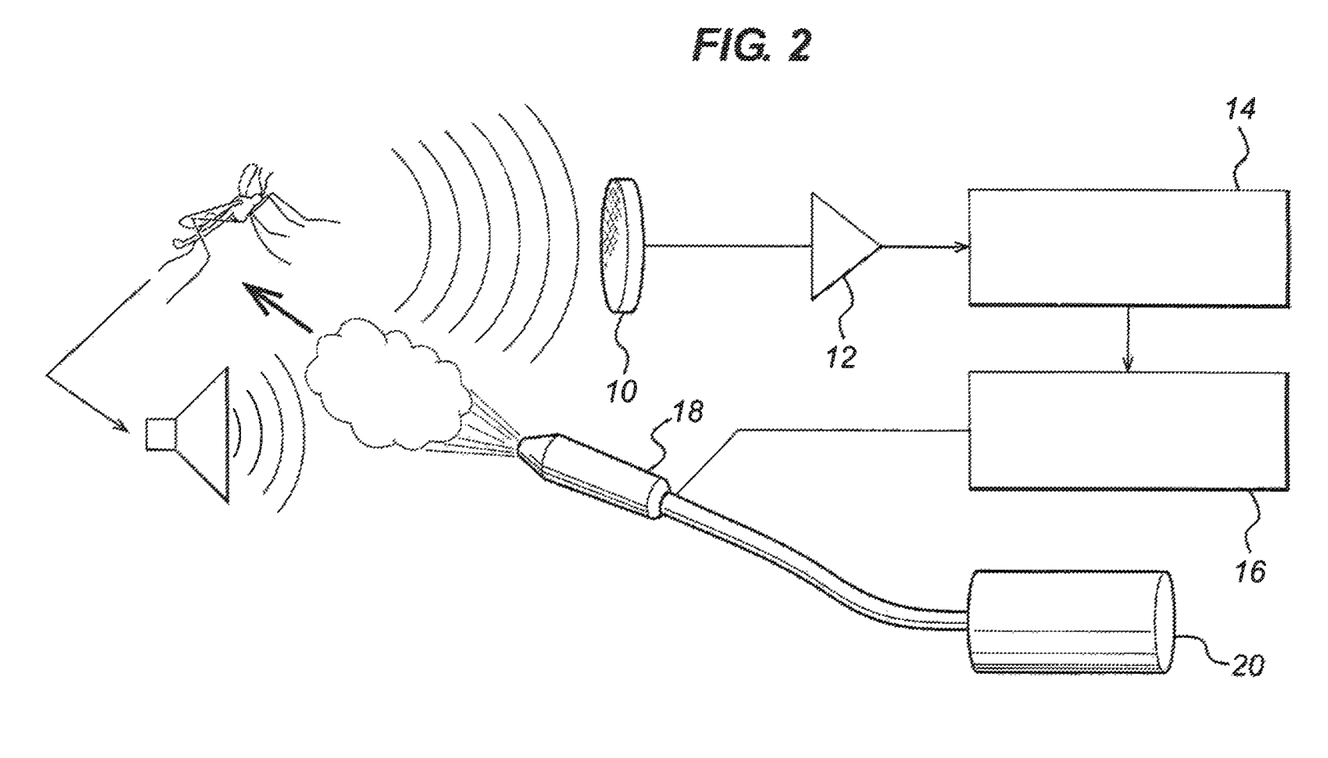
FIG. 2 is a schematic representation of a system according to a preferred embodiment of the invention.

FIG. 2 is a more detailed schematic representation of a system according to a preferred embodiment of the invention than that shown in FIG. 1. The system of FIG. 2 comprises a microphone 10 to detect incoming sound, and a pre-amplifier 12 to amplify the audio signal output from the microphone 10. The pre-amplifier 12 is coupled to an audio analysis stage 14 which processes the signal from the pre-amplifier 12 and the output of the audio analysis stage 14 is coupled to a micro-fluidic dispenser control stage 16. The output from the micro-fluidic dispenser control stage 16 drives a micro-fluidic dispenser 18 for dispensing fluid in the form of a spray from a reservoir 20.

Figure 3:
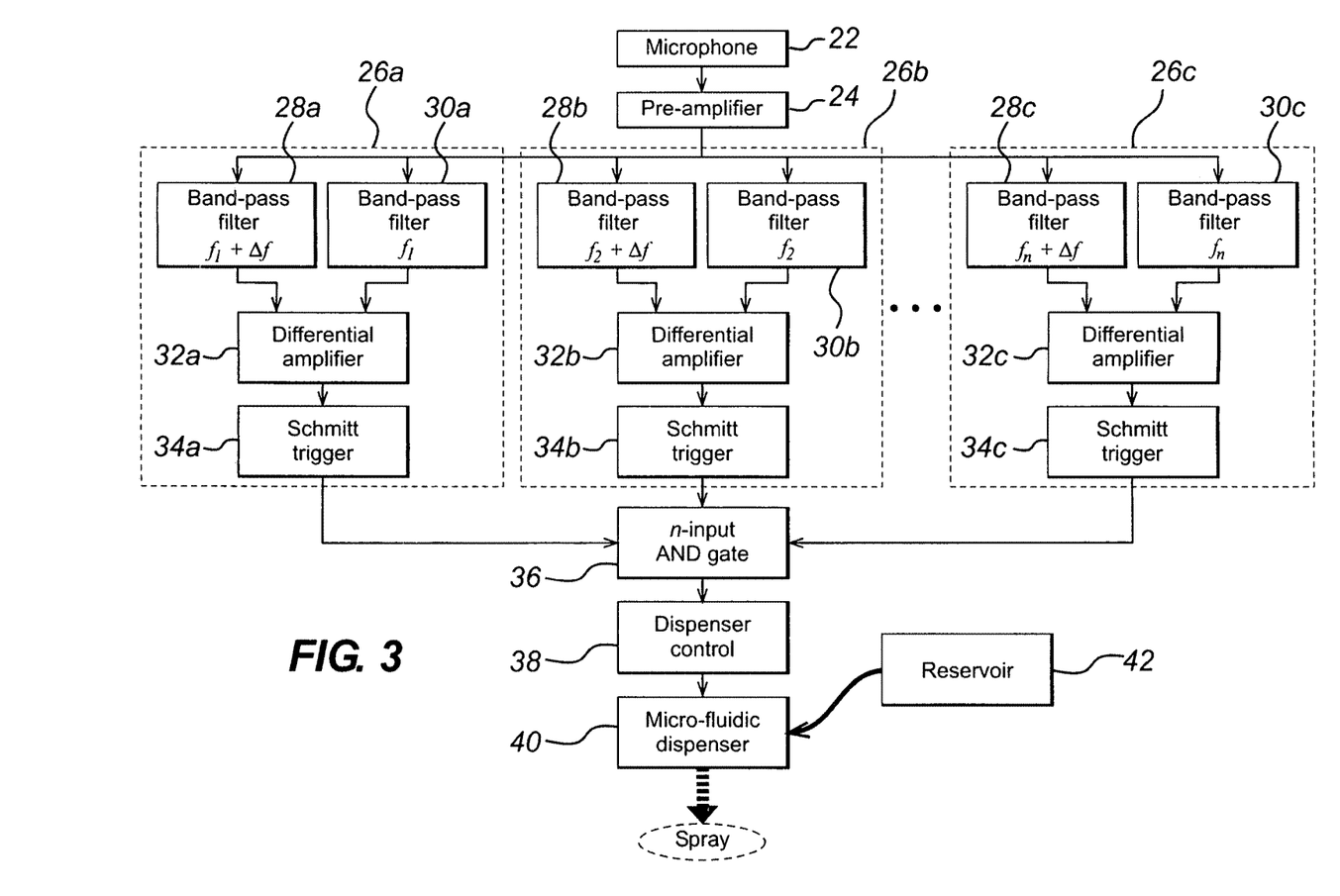
FIG. 3 is a schematic block diagram of analogue circuitry for a system according to a preferred embodiment of the invention as applied to insect repellent.

FIG. 3 is a schematic block diagram of analogue processing circuitry for a system according to a preferred embodiment of the invention such as that shown in FIGS. 1 and 2 as applied to the dispensation of insect repellent. A microphone 22 detects sounds emitted from an insect, such as a mosquito, and the output of the microphone is amplified in a pre-amplifier 24. A number of filter stages 26a to 26n are connected in parallel to the output of the pre-amplifier 24. Each filter stage 26a to 26n is tuned to a different frequency band found in the spectrum of the sound produced by the insect.

In the system of FIG. 3, each filter stage 26a to 26n comprises two band-pass filters 28 and 30, one band-pass filter 30 being tuned to a fundamental frequency and the other 28 being tuned to a slightly higher frequency. The outputs of the band-pass filters 28 and 30 for each filter stage 26 are coupled to two inputs of a differential amplifier 32 to obtain the difference between the outputs of the band-pass filters 28 and 30. The output of each differential amplifier is applied to an associated Schmitt trigger circuit 34 to produce an output when the appropriate frequency is detected. The outputs of the Schmitt trigger circuits 34 for each of the filter stages 26a to 26n are applied to the inputs of an AND gate 36. The output of the AND gate 36 is applied to a dispenser control stage 38 which controls a micro-fluidic dispenser 40 for dispensing fluid, such as insect repellent, in the form of a spray from a reservoir 42.

In the preferred embodiment illustrated in FIG. 3, the system may be used to detect, for example, excessive ambient noise levels which may cause stress to an individual and in these circumstances to emit a scent such as St John's Wort Remedy® or other aromatherapeutic scents such as lavender, chamomile, or sage which are known to reduce stress levels in some people. In this embodiment, the ambient noise level is detected by the microphone 22, amplified by the pre-amplifier 24 and then filtered in an analogue band pass filter stage 26 designed to match a human's hearing. The filtered level (amplitude in decibels) of the signal is then measured. If the level as measured exceeds or is below a predetermined amount, or is within a predetermined range, as desired, the micro-fluidic dispenser control stage 38 is activated and the micro-fluidic dispenser control stage 38 in turn activates the micro-fluidic dispenser 40 to dispense the fluid in the form of a spray. The micro-fluidic dispenser 40 may be, for example, piezo-electric device or a thermally activated device and the nature of suitable dispensers is discussed in more detail below.

The analogue technique described above in connection with FIG. 3 uses a few simple circuit elements, including band-pass filters 26 and these may also be used to detect the characteristic frequencies associated with insects such as mosquitoes. In such an embodiment, the fluid to be dispensed may be an insect repellant. Several such filters 26 may be combined to improve detection efficiency by monitoring several frequency bands associated with mosquitoes, as well as background noise.

Figure 4:
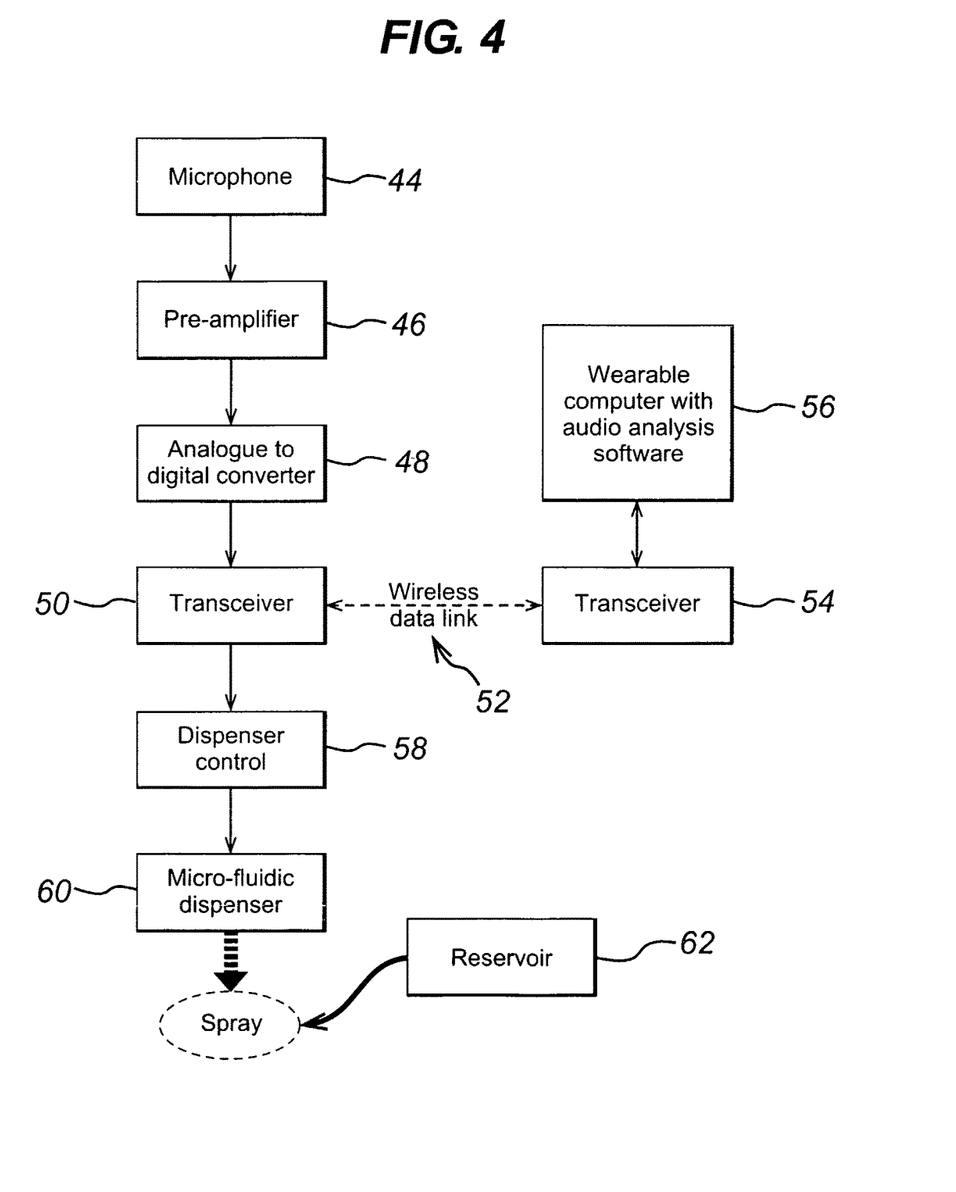
FIG. 4 is a schematic block diagram of a digital system according to a preferred embodiment of the invention as applied to insect repellent.

FIG. 4 is a schematic block diagram of a digital system according to a further preferred embodiment of the invention as applied to the dispensation of, for example, insect repellent. The digital system comprises a microphone 44 for detecting incoming sounds, and a pre-amplifier 46 is coupled to the output of the microphone 44 for amplifying the output signal from the microphone 44. The output of the pre-amplifier 46 is coupled to an analogue-to-digital converter 48. The digital output from the analogue-to-digital converter 48 is coupled to a first transceiver 50 which transmits the digital signal via a wireless data link 52 to a further transceiver 54. The further transceiver 54 is connected to a microprocessor 56, which may be, for example, in the form of a wearable computer 56, containing audio analysis software. The analysed output from the microprocessor 56 is transmitted back via the further transceiver 54 and the wireless data link 52 to the first transceiver 50. The first transceiver 50 is couplable to a dispenser control stage 58 which controls a micro-fluidic dispenser 60 to dispense fluid, such as insect repellent, from a reservoir 62, in the form of a spray.

In the embodiment illustrated in FIG. 4, sound captured by the microphone 44 is amplified by the pre-amplifier 46. The amplified signal is then digitised in the analogue-to-digital converter 48 and the digital signal is passed either directly, or through a radio (RF) or other wireless link, to the microprocessor 56 where it is processed to determine if the processed signal level exceeds or is below a predetermined level or is within a predetermined range, as desired. If so, a signal is passed to the micro-fluidic dispenser control stage 58, either directly or via a wireless link, and the micro-fluidic dispenser 60 is operated to dispense a spray of fluid. This preferred embodiment allows more refined processing of the signal than the analogue embodiment shown in FIG. 3 and, if required, the processor 56 may be housed in a separate unit from the dispenser 60 allowing a more comfortable installation for or on the user.

The device of FIG. 4 may be used to deter insects, particularly flying insects such as mosquitoes. In such an embodiment, the microphone 44 detects the sounds caused by the insects vibrating wings and the signal is filtered in a number of band-pass filters 26 to determine search for characteristic frequency nodes in the signal corresponding to the particular insect. If the insect is identified by this means then the micro-fluidic dispenser control stage 58 is actuated to activate the dispensation of fluid from the micro-fluidic dispenser 60 to eject a deterrent fluid to repel the insect. In this embodiment the micro-fluidic dispenser 60 may be located at vulnerable points of the user of the device, such as at the wrist and neck which are exposed and vulnerable to insects.

The above-described digital technique uses more sophisticated signal processing for improved accuracy of detection than the analogue technique described above in connection with the embodiment shown in FIG. 3. Sound picked up by the microphone 44 is converted into a digital signal which may be transmitted to a small wearable computer 56 via a wireless data link. The signal then undergoes frequency analysis and a software program determines whether or not a mosquito is present, or, in the more general case, whether or not noise surrounding the device wearer is identifiable as a source of psychological discomfort (the programming may include the scale described in more detail below). If a positive signal is detected, then the wearable computer 56 transmits a signal to the micro-fluidic dispenser 60 which releases a quantity of fluid such as repellent, pesticide, or a soothing scent. The computer software may also time the release of the scent so that a longer exposure triggers a series of scent releases rather than a single one.

Figure 5A:
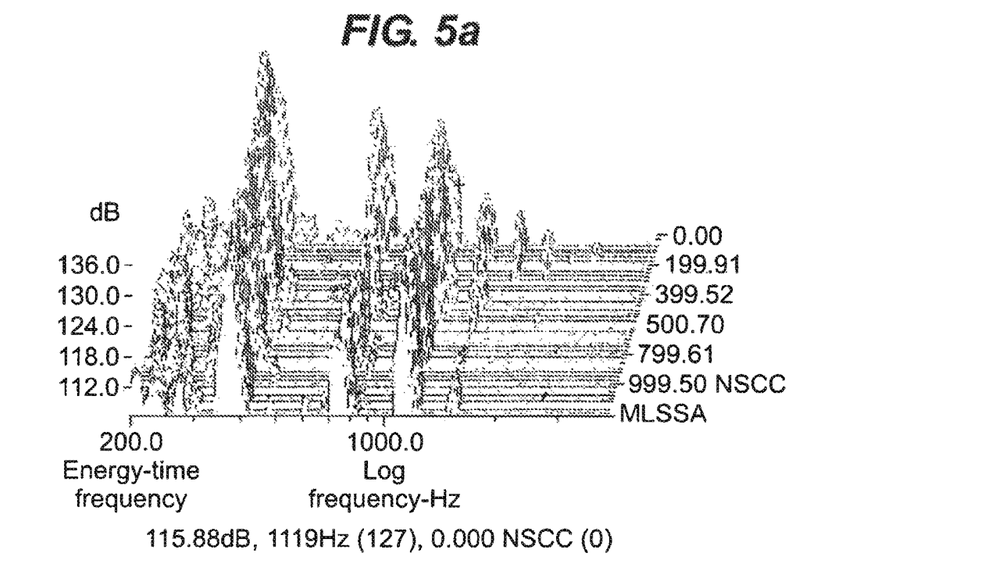
FIG. 5a is a graph showing amplitude against frequency in the analysis of an anopheles stevensi female mosquito.
Figure 5B:
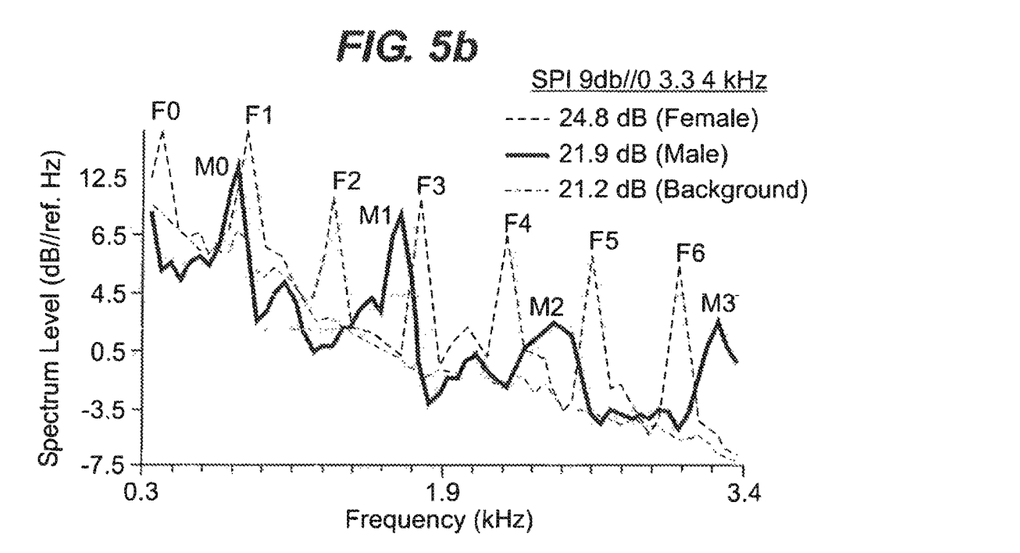
FIG. 5b is a graph showing amplitude against frequency in the analysis of individual male and female salt-marsh mosquitoes in relation to typical salt-marsh background noise.

It is known from the 132$^{nd}$ Meeting of the Acoustical Society of America 1996 in the presentation by paper by Campbell, Richard H, that the frequency spectrum of the mosquito's wing beat is highly characteristic and contains frequency peaks occurring at certain locations within the spectrum which may allow specific identification of mosquitoes using the information. It may also be possible to determine the sex of the mosquito, for example, by looking at the difference between the regularly spaced harmonics which, according to the paper by Mankin R W, published in the Journal of the American Mosquito Control Assoc. 10(2), 1994, is significantly less for the female compared to that of the male. FIG. 5a is a graph showing amplitude against frequency in the analysis of an anopheles stevensi female mosquito and FIG. 5b is a graph showing amplitude against frequency in the analysis of individual male and female salt-marsh mosquitoes in relation to typical salt-marsh background noise. Determination of the species of mosquito may also be possible allowing more advanced protection. For example, a species know to carry a particular disease could also activate an audible warning to alert the user of the increased threat.

An advantage of digital processing in the above described embodiments is that the duration of the operation of the micro-fluidic dispenser 60 may be controlled according to the circumstances.

Figure 6:
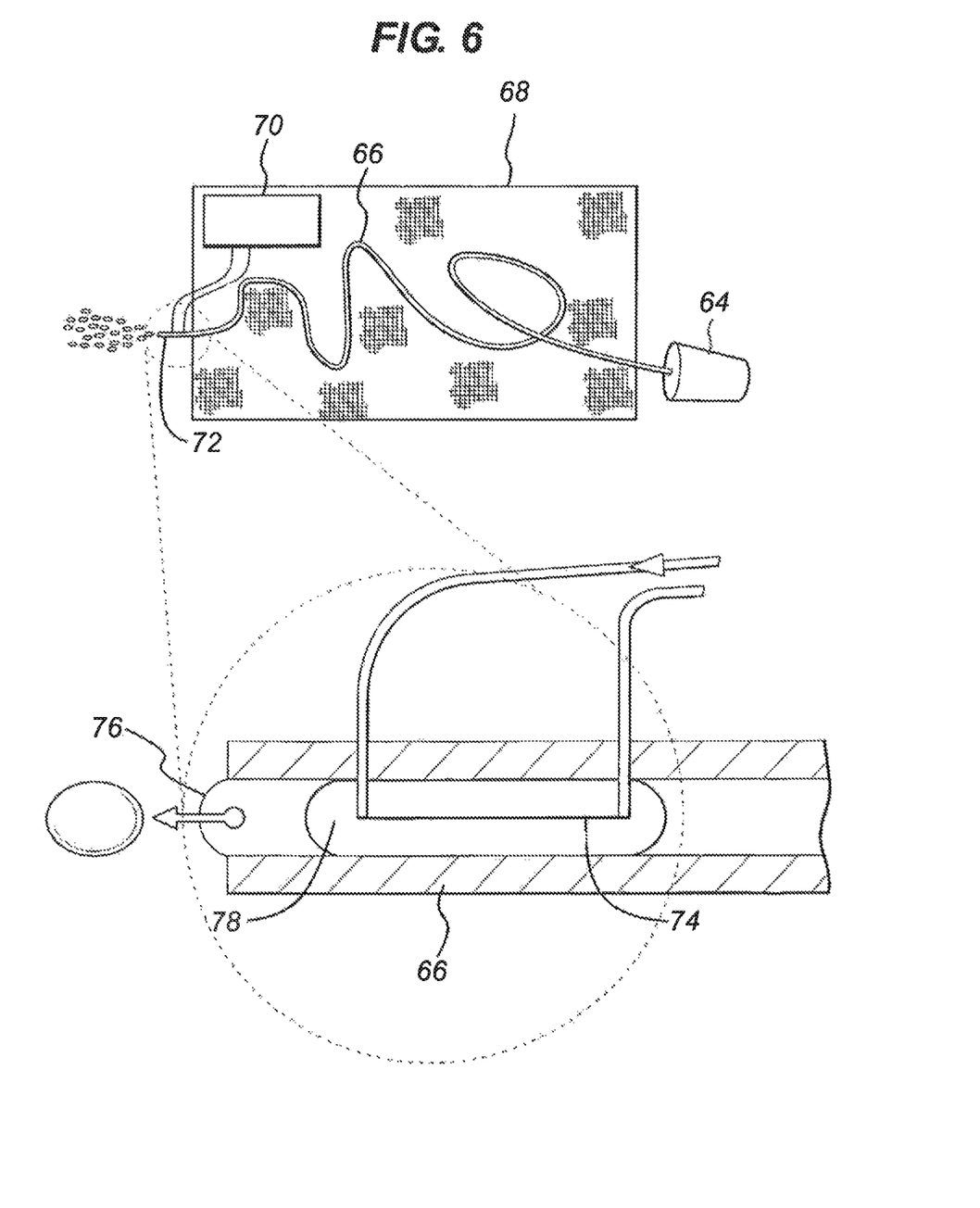
FIG. 6 is a schematic representation of a thermally actuated dispenser according to a preferred embodiment of the invention embedded into fabric.

FIG. 6 is a schematic representation of a dispenser device according to a preferred embodiment of the invention embedded into fabric. The dispenser device comprises a fluid reservoir 64 and a capillary tube 66 connected to the reservoir 64. The capillary tube 66 and, in a preferred embodiment the whole dispenser device, may be, for example, woven knitted or sewn into, or otherwise embedded in a fabric 68 such as a garment or a user, or bed linen. A dispenser control stage 70 operates a thermally actuated dispenser 72. The thermally actuated dispenser 72 is connected to one end of the capillary tube 66, the other end of the capillary tube 66 being connected to the fluid reservoir 64. The dispenser control stage 70 is connected to a fine wire 74 which is threaded through a short length of the capillary tube 66. In use, the capillary tube 66 may be filled with the fluid 76 to be dispensed.

To eject the fluid from the dispenser device, in operation, the dispenser control stage 70, when instructed by processing control circuitry, passes an electrical current pulse through the fine wire 74 causing rapid heating and vaporisation of the fluid 76 surrounding the wire in the capillary tube 66 to form a bubble 78 within the capillary tube 66. The pressure generated by expansion of the bubble 78 forces the remaining fluid between the wire 74 and the end of the capillary tube 66 to form a droplet of fluid which is forced out of the end of the capillary tube 66 and into the dispenser 72 from where it is ejected into the atmosphere surrounding the dispensing device. The high back-pressure due to the length of capillary tubing prevents significant flow towards the reservoir 64. After the pulse of current has been applied, the fine wire 74 cools down and capillary action draws more fluid from the reservoir 64 into the capillary tube 66. The process may be repeated by pulsing current through the wire 74 at an appropriate frequency and the droplets ejected from the capillary tube 66 are then ejected from the dispenser 72 to form a spray. The reservoir 64 is constructed to prevent the build-up of a vacuum which would restrict flow from the reservoir 64. This can be achieved with the use of an elastic reservoir which is able to decrease in volume as fluid is drawn from it.

As mentioned above, the use of capillary tubing 66 and a wire heating element 74 allows the dispenser device to be woven or otherwise embedded into the fabric of, for example, clothing. In such an embodiment, the point at which fluid is dispensed and the fluid reservoir 64 may be placed at any point on the surface of the clothing allowing greater design flexibility.

Figure 7:
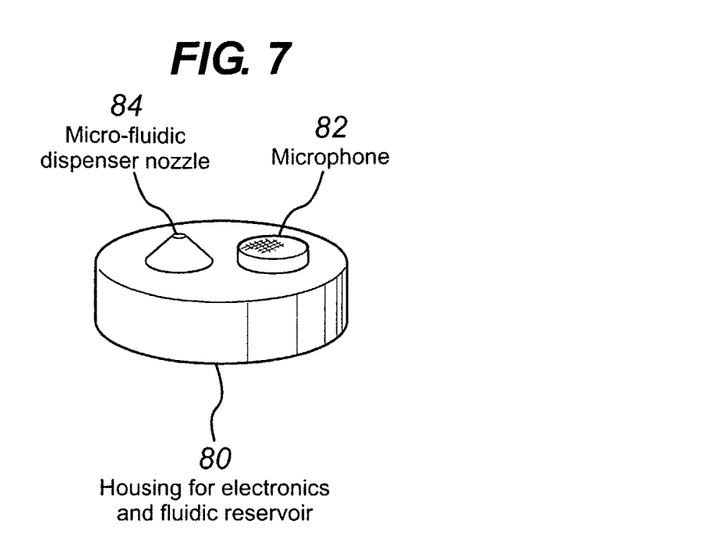
FIG. 7 is a schematic representation of a device according to a preferred embodiment of the invention.

FIG. 7 is a schematic representation of a device such as any of those shown in FIG. 1, 2, 3, 4 or 6, according to a preferred embodiment of the invention, wherein the device is encapsulated in a single unit. A housing 80 contains the processing circuitry and the micro-fluidic reservoir (not shown). Mounted on the outer surface of the housing 80 is the microphone 82 and a micro-fluidic dispenser nozzle 84 through which fluid stored in the micro-fluidic reservoir may be dispensed.

Figure 8:
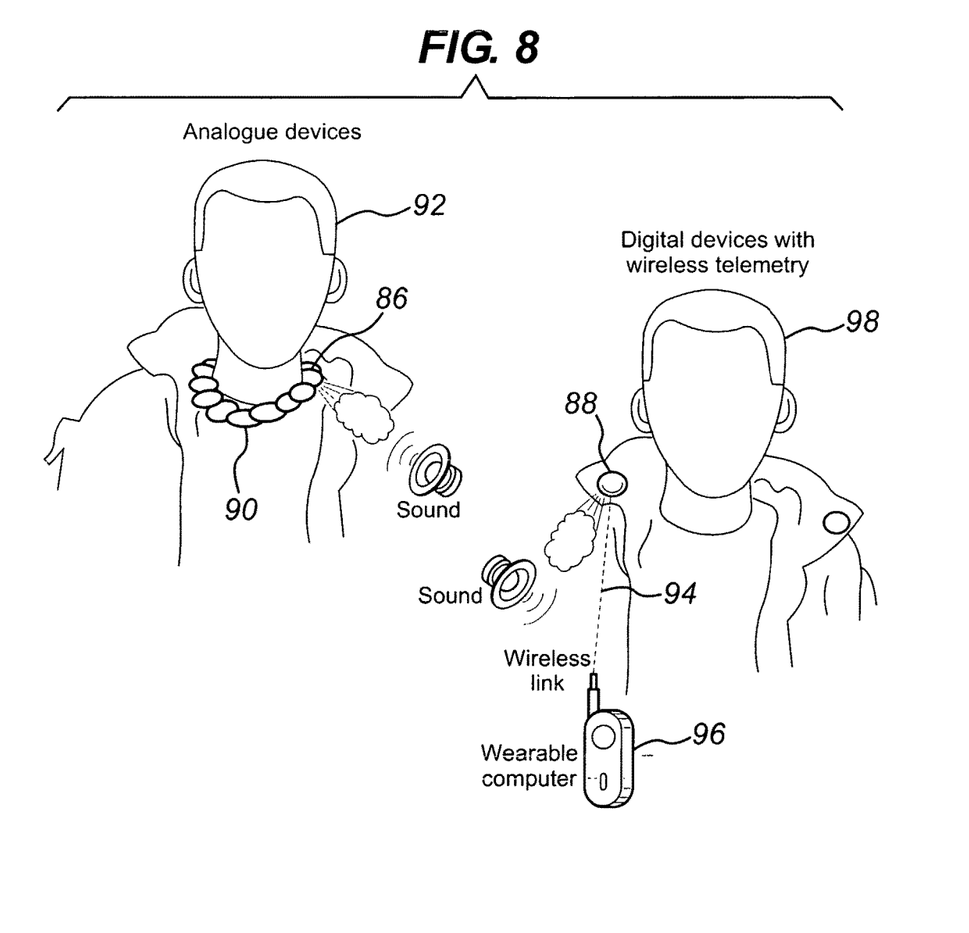
FIG. 8 is a schematic representation of a pair of devices according to a preferred embodiment of the invention.

FIG. 8 is a schematic representation of a pair of devices such as the device shown in FIG. 7. In this embodiment, one device 86 is an analogue device such as that shown in FIG. 3 and the other device 88 is a digital device such as that shown in FIG. 4. The analogue device is shown mounted in a necklace 90 worn around the neck of a user 92 and the digital device 88 is shown with a wireless link 94 separating the processing electronics 96 from the dispenser unit 88. The processing electronics 96 may be encapsulated in the form of a wearable computer which may be mounted, for example, on a belt worn by a user, and the dispenser unit 88 is shown mounted as a brooch or clip which may be secured to a user's 98 clothing.

In use, the analogue device 86 may be more suitable for detecting normal sounds and may be incorporated into a single small unit. By contrast, the digital device 88 may be most suitable for use as an insect repellent. As the digital device 88 may require more circuitry to process the signal, it is preferably formed in two separate units linked by, for example a wireless link, so that the processing unit 96 may be worn unobtrusively by the user of the device 88, as shown in FIG. 8. The analogue device 86 may be worn, for example, as a necklace 90 and, when activated by sounds, emits the spray of scent as required. The digital device 88 is shown as preferably being in two parts, and the processing unit 96 may be worn, for example, on a belt or in a pocket and the dispenser unit may be worn as a brooch or clip attached to the outer garment of the user. On receiving a signal from a mosquito or other insect, the dispenser unit 88 passes a signal to the computer 96 where it is processed and if accepted by the computer the signal is sent back to the dispenser unit 88 causing it to dispense repellent as required.

Figure 9:
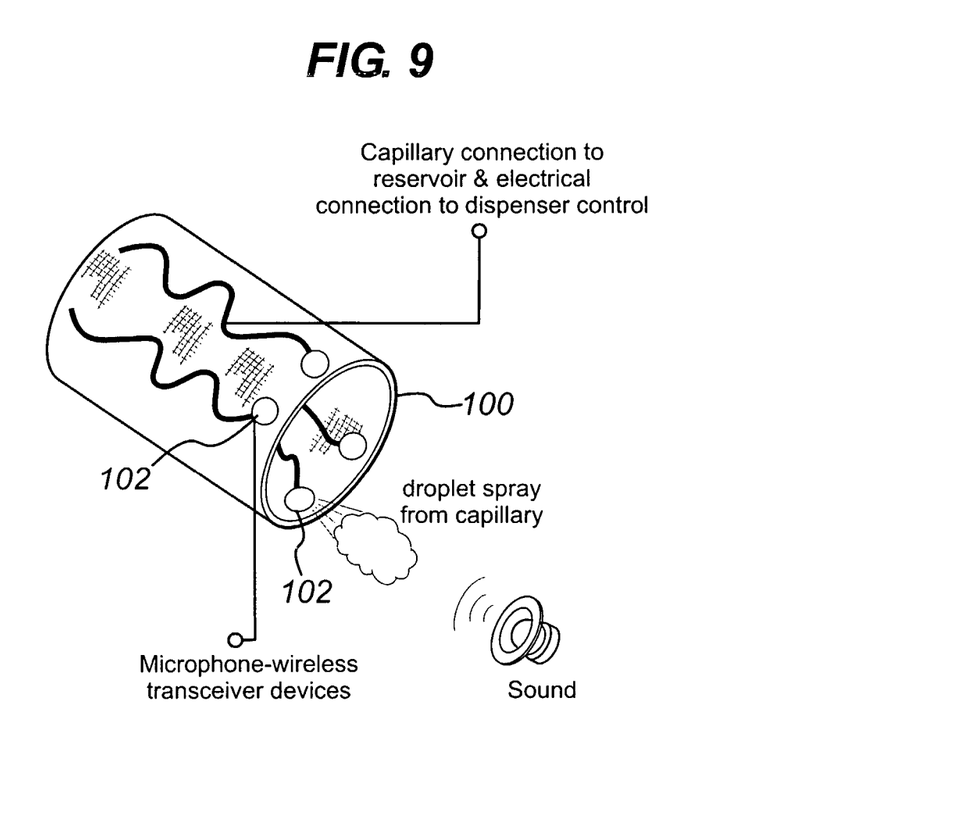
FIG. 9 is a schematic representation of a device according to a preferred embodiment of the invention embedded into a sleeve of a garment.

FIG. 9 shows a schematic representation of a further preferred embodiment of the device according to the invention embedded into a sleeve 100 of a garment. In this embodiment, the microphone and wireless transceiver devices 102 are mounted on the cuff of the sleeve and the capillary connection to the reservoir and electrical connection to the dispenser control stage are concealed in the lining of the sleeve 100. The droplet spray dispenser is also built into the cuff of the sleeve 100.

In the above described embodiments, the small size of the electronics required allows easy integration into a user's clothing as well as the possibility of multiple devices incorporating the system to provide more complete protection to the user, for example in the case of the use of the dispenser as an insect repellant dispensing system. Alternatively, any one or more of the devices embodying the invention may be integrated into or be worn as a discrete piece of jewellery.

Surface mount technology (SMT) may be used to keep the size of the device small and the electronic circuitry may be formed on a PCB board.

The transceivers 50 and 54 in the devices embodying the invention such as that illustrated in FIG. 4, may be initialised and programmed prior to use. This may be achieved via a microprocessor which may be linked to the devices via a standard parallel port cable connected to an interfacing circuit. Dedicated software may be used to initialise and setup various parameters of the devices after which they are disconnected from the interfacing circuit and may be run freely until the power is turned off. In another embodiment, such initialisation could be performed by a microprocessor chip which could either be integrated into the device or be placed into a separate unit.

In order to dispense the fluid in any one or more of the above described embodiments, a micro-fluidic device may be used to produce a cloud of fine droplets of fluid. In the case of the dispensing of repellent or pesticide towards an approaching mosquito, the micro-fluidic device may be used to produce a cloud of fine droplets of chemical agent in the region where the mosquito is detected. Two examples of suitable devices for producing such a cloud are piezo-electric devices and thermally actuated devices ('bubble-jets') both of which are commonly used for inkjet printing.

Piezo-electric devices such as those based on PZT (lead zirconate titanate) are commonly used for ejecting droplets of liquids for various applications. Such devices consist of a micro-fluidic channel through which the liquid flows and a piezo crystal positioned in close contact with the channel structure. Application of an electrical voltage across the crystal causes a small but rapid deformation of the channel which ejects a small droplet through a nozzle. Such devices have several advantages including reliability, ease of control, low power requirements, the ability to eject very small droplets at high frequencies and with no speed for propellants and they can be mass produced allowing low cost.

Thermally actuated devices operate in a similar manner to piezo-electric devices except a small region of the micro-fluidic channel is heated instead of using a piezo-electric crystal. The heat causes vaporisation of the fluid which causes a droplet to be ejected.

In a preferred embodiment, a micro-pump may be used in an evaporation driven system and for generating a spray a (single) nozzle inkjet head may be used. In such an embodiment, the drive electronics apply (harmless) high voltage pulses to the PZT crystal causing it to deform slightly above a micro-fluidic chamber which forces a droplet to be ejected. Droplets are ejected from the inkjet head through a small hole on the edge of the device and have a typical volume of 100 pL which allows efficient evaporation of the scent into the atmosphere.

The scent may be stored in a short piece of plastic tubing (capillary tube 66), the size of which can be varied depending on the total volume required.

The device according to a number of the preferred embodiments of the invention described above contains an electronic sound analysis stage for measuring frequency and decibel levels in relation to pre-programmed sones, according to the logarithmic relationship described below. The way in which the signals received in any of the above-described embodiments is processed may be as follows. The human ear is capable of hearing a very large range of sounds. Psychologists have also determined that our sense of hearing is roughly logarithmic. To deal with such a range in devices embodying the present invention, logarithmic units are applied according to a scale as described below.

The human ear does not respond equally to all frequencies. Humans are much more sensitive to sounds in the frequency range of about 1 kHz to 4 kHz than to very low or high frequency sounds. For this reason, sound meters are usually fitted with a filter whose response to frequency is similar of the human ear. If an "A weighting filter" is used, the sound pressure level is given in units of dB(A) or dBA. Sound pressure level on the dBA scale is easy to measure and is therefore widely used. It is still different from loudness, however, because the filter does not respond in quite the same way as the ear.

Figure 10A:
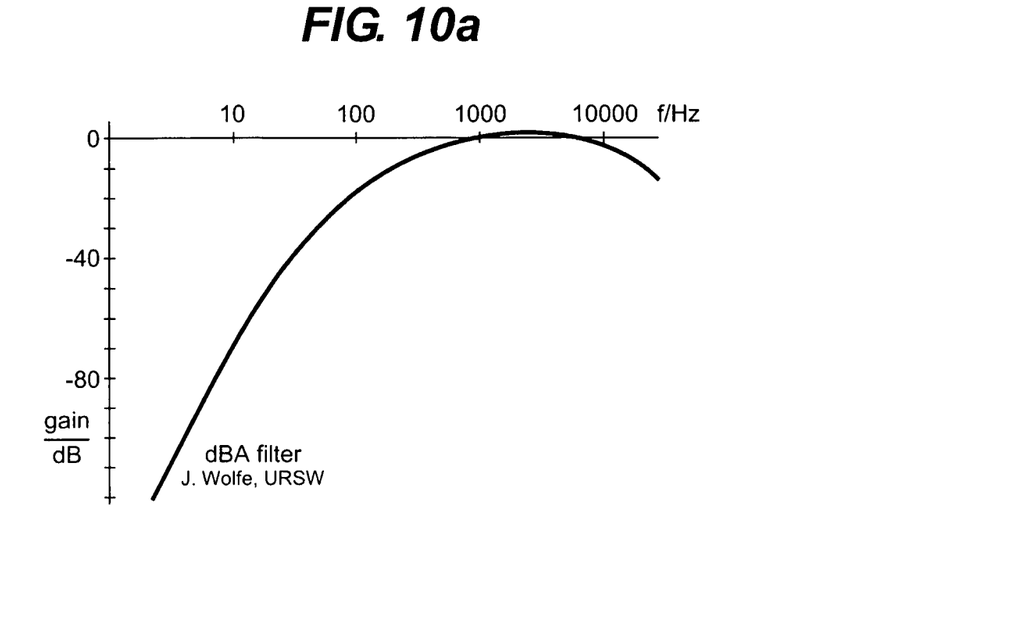
FIG. 10a is a graph showing the intensity response of an A filter as used in a system according to a preferred embodiment of the present invention to simulate the response of the human ear to sound.
Figure 10B:
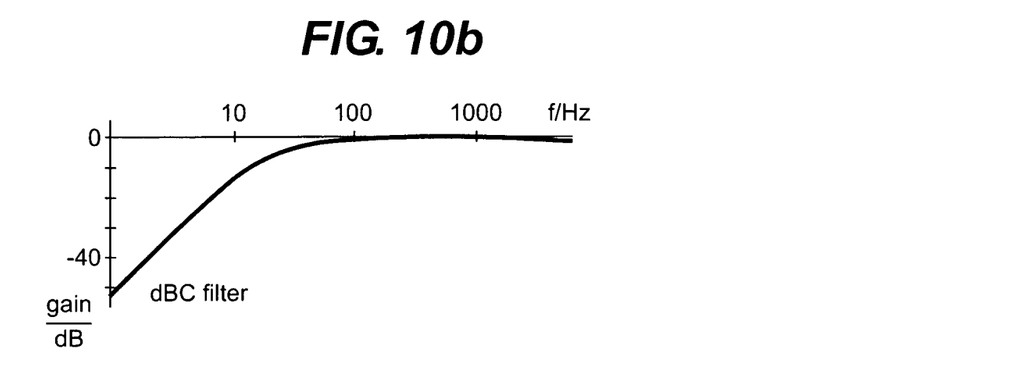
FIG. 10b is a graph showing the loudness response of an C filter as used in a system according to a preferred embodiment of the present invention to simulate the response of the human ear to sound.

The most widely used sound level filter is the A scale, which roughly corresponds to the inverse of the 40 dB (at 1 kHz) equal-loudness curve. Using this filter, the sound level meter is thus less sensitive to very high and very low frequencies. Measurements made on this scale are expressed as dBA. The C scale is practically linear over several octaves and is thus suitable for subjective measurements only for very high sound levels. Measurements made on this scale are expressed as dBC. FIGS. 10a and 10b show respectively the response of the A filter (FIG. 10a) and C ((FIG. 10b) filter, with gains in dB given with respect to 1 kHz.

Figure 11:
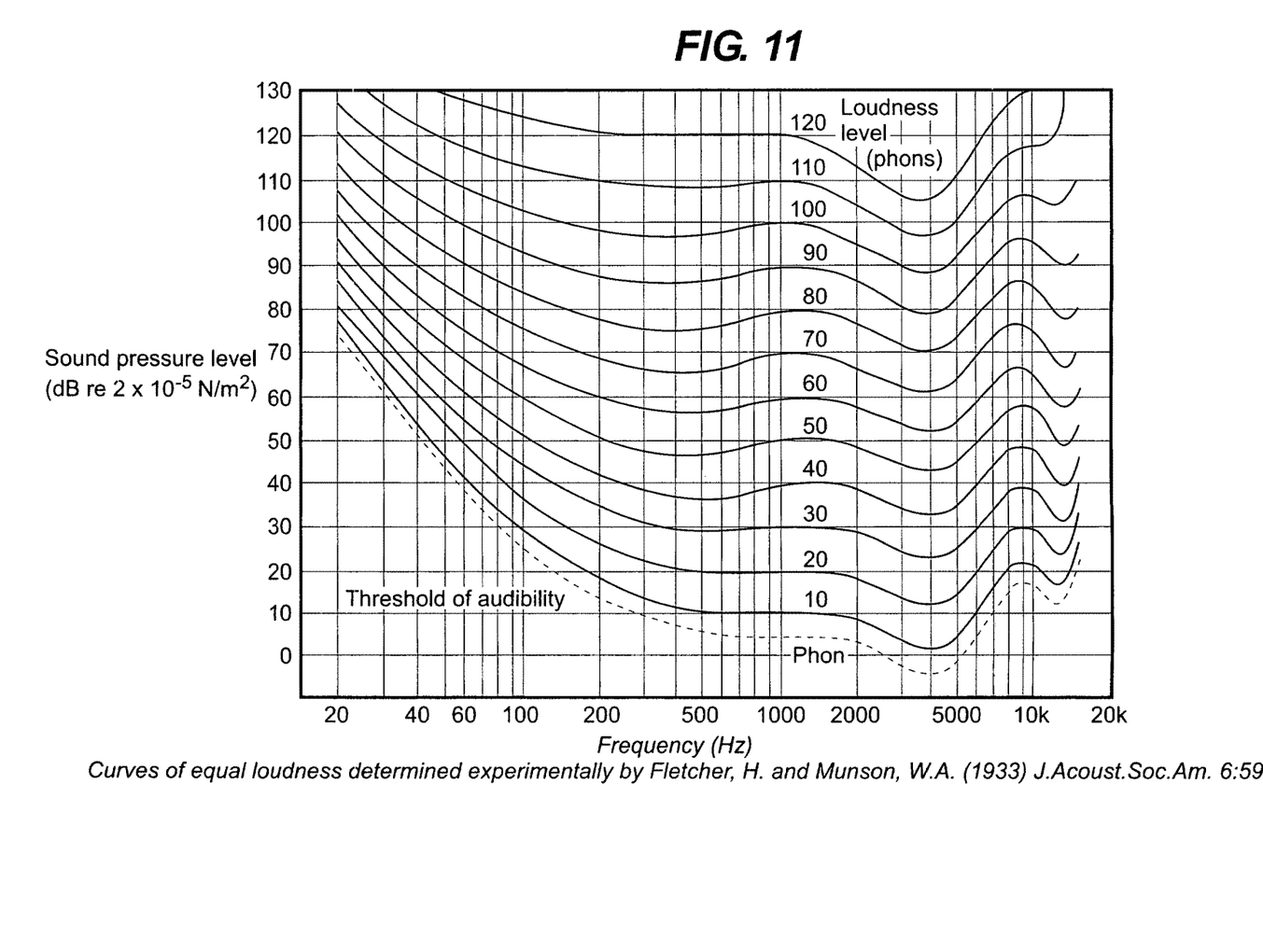
FIG. 11 is a graph showing Fletcher-Munson curves used to convert decibels to phons for use with a preferred embodiment of the present invention.

The phon is a unit that is related to decibels (dB) by the psychophysically measured frequency response of the ear. At 1 kHz, readings in phons and dB are, by definition, the same. For all other frequencies, the phon scale is determined by the results of experiments in which volunteers were asked to adjust the loudness of a signal at a given frequency until they judged its loudness to equal that of a 1 kHz signal. To convert from decibels (dB) to phons, the Fletcher-Munson curves such as those shown in FIG. 11 are used, and the graph depends on sound level (it becomes flatter at high sound levels).

One can convert from decibels (which can be measured by an instrument) to sones (which is the approximate loudness as perceived by people). This is usually done using tables found in conventional acoustics handbooks. It has been postulated that the A weighting curve approximates the human frequency response at low to moderate sound levels, so dBA is very roughly the same as phons. Then one can also use the logarithmic relation between sones and phons described above.

The systems and methods according to the present invention may be particularly useful in the production of devices for use, for example, in a wide range of applications including the following:

(1) programming the sound and frequency of a baby's cry a wearable computer may be left in the baby's room so that when the baby cries the device delivers a replica of the smell of the parent through buttons in the baby's clothing, and through devices placed around the baby's cot.

(2) programming for interval-timed release of 'scents' in response to pleasurable sones, the device being embedded either in a personal wearable device, into the wearer's clothing, or other fabric, or in a decorative object left in a room.

(3) Scent delivery activated by, for example, specific notes, octaves, symphonies, melodies, beat, pitch, scales, and harmonies to create 'multisensory' entertainment to:

create a multisensory symphony of perfumery 'notes' (as used in the fragrance industry) and musical 'notes' enable a new method for learning a musical instrument create/enable the above and/or include the addition of a colour palette, create a colour therapy aromatherapy rainbow with, for example, digitally controlled colour and scent formulations ('recipes')

deliver 'colour odorant' benefit chemicals in controlled ways responding to the environment and personal needs create monochrome/mono chord music tones, or scent notes i.e Yves Klein painting (4) Examples of stress-causing situations which may be eased by use of the device to dispense stress reducing scents include:

Hyperacusis: A painful sensitivity to loud sounds such as:
chalk on the black board at school
the piercing drill at the dentist
screech of brakes drawing in at a station
close proximity to aeroplanes (fear of boarding a plane)
a road digger
Sound Phobia—a specific 'inbuilt' dislike in a person and fear of something:
in tropical countries, the sounds of wind, crashing thunder, stormy waves
wild animals/insects because of the danger they represent
sounds of the school bell (the dread of going to school)
scolding parents/teachers disliked by school children
firework display (humans and animals)
sounds commonly restricted or prohibited in by-laws ie. street music, all-night raves, shouts and cries of vendors, barking dogs, carpet beating, noisy trades and industry, radios, PA's and loudspeakers
fire alarm, sirens
wailing at a funeral, mass burial, mortuary
abattoir, slaughter of animals
WARFARE ('Wellbeing' Scent diffusion for the armed forces):
sound of gunfire, bombs, artillery,
dying soldiers
aggressive shouting
torture (5) insect repellent delivery (6) bear repellent (which may have particular use in Canada)

(7) a repellent for dangerous animals such as dogs.

(8) personal protection (building a customised 'scent bubble')

(9) hearing Loss: Decreased auditory perceptive ability caused by:
Presbycusis: greatest loss takes place in higher frequency (for example due to ageing)
Noise pollution: through exposure to modern urban noise (particularly prevalent in New York)
Occupational noise exposure: industrially-induced hearing loss (factories, apparatus, space research, laboratories, building site etc)
sociocusis—hearing loss from non-occupational noise exposure
damage to auditory mechanism reveals that noise contributes to:
loss of sleep
tension, headaches
sexual impotence
heart disease
mental illness
bi-polar disorder: sensory overload, sound hallucination
Schizophrenia (hearing terrifying 'sounds' causes fear)
depression, anxiety (sound of own voice, third party)
all of the above may contribute to more complex psychological and social problems sensory impaired/reduced vision BLIND DEAF—scent as essential (10) communication tool:
Mobile phone 'rings tones' releases recognizable 'scent tone' to identify a caller
Scent releasing home alarm system for deaf and warning system for the elderly
Time-keeping (watches/clocks) Computerized scent-output for chimes (based on religious clocks)
Picks up on certain unidentifiable 'Sounds' in hearing aid
clothes may release a recognizable (learned) scent as warning signal, alarm system (11) Tinnitus—An intense ringing sound heard in the ear caused by prolonged exposure to loud sound
short exposure to very loud sound
temporary or chronic, or as the result of taking drugs ie aspirin
hearing aid or similar sensor would detect ailment and release scent (12) 'White noise'—a sound or signal consisting of all audible frequencies with equal intensity
creative tool for new media artists
Artificially created 'No sound' 'no scent' (white noise and white smell)

(13) 'pink noise'—a noise where each octave band has the same intensity.
does not sound as bright as white noise
intensity of the spectrum does not increase with higher frequencies
creative tool for new media artist (14) Ambient sounds for wellbeing and life enhancement
nightclubs, chill-out music, atmospheric relaxing ambience, art galleries,
installation art, fashion demonstrations
music categories:
Classical
Opera
Pop
dance/house
Reggae
Drum and base
Techno
Heavy metal I rock etc.
conversation in a restaurant, living room, work studio, office
stillness of a forest, the beach, river, 'the Rockies' water fall etc (15) Sound effects—a pre-recorded or simulated sound produced for a radio, television, film or theatrical program to suggest/enhance an actual sonic environment
cinematic multi-sensor/al smeliware' T-shirt/clothes, theatre upholstery (chair)
with embedded scent diffusion to enhance specific sound effect to evoke I stir
up emotion, trigger/widen the imagination
educational purposes in books, the classroom and promote creativity
sound/scent effects in health spa, wellbeing centre (bath robes)
promotion: holiday trinket/necklace—inspired by the Tahitian
Tiare flower 'lei'
given out by tour promoter on arrival in i.e Tahiti, interacts with native music.

(16) Sound romance: Sounds experienced during childhood
  Multisensory enhancement for nostalgia (scent and sound)
  often become romances for the adult
  old or past sounds are elevated to category of sound romances in memory
  clothes hold 'memories' i.e.
  the scent of deceased grandparent when hearing certain sound/music
  first lover
  childhood holiday, positive experience:
  Brownie songs and scent of camp fire
  first memory of favourite music, pop song
(17) Sacred noise: prodigious sound exempt from social proscription: natural phenomena:
  volcanic eruptions, thunder and storms (regarded as sacred noise)
  social noises which, during certain periods of history, have escaped the attention of noise abatement legislators, e.g. church bells, industrial noise, moozak, amplified pop music, etc.
(18) Tempo: Considerable involuntary physiological reaction is related to tempo:
  notably the pulse rate, blood pressure and respiration rate
  clothes that 'hear' noises, rhythms from the human body i.e
  increased heart beat after sport (refresh, deodorize)
  snoring (scents for suffering partners in the bed)
  other human noises (non-tempo)
  Stomach rumbling (hunger)—scent-output as 'reminder' for eating disorders (anorexia) for those who 'forget' to fuel their bodies
  Incontinence noises, 'excessive farting, wind' (elderly/hospital linen)
  Baby's crying
  release calming scent to baby (i.e mother's personal lactation odour, chamomile etc)
  release scent of newborn baby to calm anxious parents (this scent is a natural opiate and designed to boost hormones)
  'Sneeze' (medication, lavender, eucalyptus) Wheezing—Ventalin™ delivery
  cough (not recommended for asthmatics/allergies) adults crying
  anger management (your own or someone else's
  'Voice' sound recognition—specific tone of:
  anxiety, stress, upset
  withdrawn, timid, under confident, lack of self esteem, sad
  'pain noises', labour—contractions,
  mania, OCD (obsessive compulsive disorders) repetitive words
  Euphoria, ecstasy, excitement, joy, elation,
  surprise, disgust, sympathy etc.
(19) Romance and sexual sounds (orgasmic, panting, moaning etc) Scent boost for sex:
  Aphrodisiac scents (essential oils and/or fragrances)
  Pheromones for sexual dysfunction and fun/enhancement Further embodiments of the present invention may comprise one or more sensors which are not necessarily arranged to release a scent on detection of a particular sound but in response to other properties such as biometric properties.

Furthermore, the sensors, the micro-fluidic dispensing apparatus and even micro-tubing for transporting the fluid to be dispensed may be woven, knitted, embroidered or otherwise embedded into one or more layers of fabric to form a type of "second skin" or membrane from which pulses of scent or fluid may be dispensed under control. The fluid may be dispensed such that it is sprayed away from the user, or directly onto the skin of the user, depending on the type and nature of the fluid used.

Also, in a further preferred embodiment, fluids such as "well-being" scents may be dispensed in the form of an atomised mist targeted towards specific points of the user's body to minimise odour pollution of the surrounding atmosphere.

With regard to possible fluids suitable for dispensing, a number of fluids are known to have particular effects on some people, for example:
  Bergamot—may alleviate anxiety
  Chamomile—may sooth a headache
  Peppermint—may assist in the sustaining of attention
  Tea tree—may stimulate the immune system
  Lemon—may improve concentration
  Mint—may help with indigestion
  Melissa—may assist in calming a person, for example before public speaking
  Rose—may assist in maintaining a happy mood
  Eucalyptus—may assist in the healing of bronchitis
  Ylang ylang—may lower blood pressure
  Marjoram—may assist in reducing the sensation of fear
  Nutmeg—may act as an aphrodisiac
  Lavender—may encourage sleep In one or more embodiments, the system may be arranged to be responsive to biological conditions (which may reflect the user's mood and emotions such as fear or sadness, as well as health) and the dispensing of specially selected fluids may enhance the psychological and/or physiological state of the user. Thus, such devices may be medicinal or therapeutic to the wearer. Also, in a preferred embodiment, the system may form a healing dispensary system for the dispensing of fluid for example in the case where the user has suffered muscle or bone trauma. In another embodiment, the system may be arranged to provide a pulsating aromatherapeutic back massage with fluid dispensing outlets being position for example adjacent/along the spine of the user.

In a further preferred embodiment, the sensor(s) in the system may assist in the diagnosis or identification of particular conditions of the user such as ovulation and in such an example, a scent could be released to speed up or slow down hormones, or detect illnesses such as TB, diabetes, lung cancer by appropriate sensor selection. Preferred embodiments may also assist in the reduction of side effects from medication such as headaches, excessive sweating, irritability, agitation, restlessness or disturbed sleep patterns by the detection of these conditions and the dispensing of a suitable scent.

It is possible, in a further preferred embodiment, for the system to be arranged to be encapsulated into a portable aroma pod, aromatic jewellery, or encapsulated in fabric to form, for example, and depending on the type of fluid dispensed, a vitamin-enhanced fabric, an anti-stress/tobacco fibre, or an anti-cellulite fibre. The scents dispensed may therefore have beneficial effects to address social, erotic, analgesic or emotional needs of users who may be suffering from depression, irritation, stress, apathy, or happiness, sensuality, relaxation or stimulation issues. The scents to be dispensed may include scents known to reduce in some people performance-related stress, startle reflexes, heart rates, and blood pressure, or scents known to regulate adrenalin flow, stimulate the adrenal cortex, sooth muscle stiffness and improve the recovery of skin after trauma.

Also, the system may be incorporated into other devices such as a cd player, miscellaneous gadgets, computer games, shower heads, clocks (to act as a 'wake-up' device) and other devices which may be used to fragrance the home or more generally, the environment. The system may even be activated by particular websites.

Thus, in summary, one or more preferred embodiments of the invention may be arranged to assess the user's needs and respond appropriately with the dispensing of a scent appropriate to those needs.

Various modifications to the embodiments of the present invention described above may be made. For example, other materials and method steps can be added or substituted for those above. In particular, different forms of devices embodying the present invention may be made such that the device is disposable, re-fillable, cartridge-based having a number of cartridges containing one or more different scents. Thus, although the invention has been described above using particular embodiments, many variations are possible within the scope of the claims, as will be clear to the skilled reader, without departing from the invention.

The invention claimed is:

1. A wearable device for dispensing fluid in response to one or more sensed sounds, comprising:
   a sensor for sensing one or more sounds;
   a processor for determining when the one or more sensed sounds is/are within a predetermined range, above a predetermined level or below a predetermined level; and
   a dispenser for dispensing a fluid into an area surrounding the device when the one or more sensed sounds is/are determined by the processor to be within the predetermined range, above the predetermined level, or below the predetermined level;
   wherein the dispenser comprises a capillary tube containing the fluid and a piezo-electric or thermally-actuated device, which is actuated to eject fluid from the capillary tube.

2. The device according to claim 1, wherein the sensor comprises a microphone.

3. The device according to claim 1, wherein the processor is arranged to determine a frequency or frequencies or an amplitude of the one or more sounds.

4. The device according to claim 1, wherein the processor is arranged to determine a source of the one or more sounds.

5. The device according to claim 1, wherein the processor comprises one or more filters.

6. The device according to claim 5, wherein the one or more filters comprise one or more band-pass filters.

7. The device according to claim 5, wherein the processor further comprises an amplifier connected between the sensor and the one or more filters.

8. The device according to claim 1, wherein the sensor has an output, the processor further comprises an amplifier connected to the output of the sensor and having an output, and an analogue-to-digital converter connected to the output of the amplifier.

9. The device according to claim 8, wherein the analogue-to-digital converter has an output signal, and the output signal is transmitted to the processor using a wireless link.

10. The device according to claim 9, wherein the processor includes audio analysis software for determining when the one or more sensed sounds is/are within the predetermined range, above the predetermined level, or below the predetermined level.

11. The device according to claim 1, wherein the device is an item of jewelry.

12. The device according to claim 1, wherein the device is incorporated in a fabric.

13. The device according to claim 1, wherein the fluid to be dispensed comprises an insect repellent.

14. The device according to claim 1, wherein the fluid to be dispensed comprises a scent.

15. The device according to claim 1, wherein the dispenser comprises the thermally-actuated device, which comprises a wire within the capillary tube and the wire is arranged to receive one or more pulses of current to vaporize the fluid in the capillary tube surrounding the wire, causing one or more droplets of the fluid to form and be ejected.

16. A device for dispensing fluid in response to one or more sensed sounds, comprising:
   a sensor for sensing one or more sounds, wherein the sensor has an output; an amplifier connected to the output of the sensor and having an output; an analogue-to-digital converter connected to the output of the amplifier; a processor for determining when the one or more sensed sounds is/are within a predetermined range, above a predetermined level or below a predetermined level; and a dispenser for dispensing a fluid into an area surrounding the device when the one or more sensed sounds is/are determined by the processor to be within the predetermined range, above the predetermined level or below the predetermined level;
   wherein the analogue-to-digital converter has an output signal which is transmitted to the processor using a wireless link, and the processor has an output signal which drives the dispenser and is transmitted to the dispenser using the wireless link.

* * * * *